UNITED STATES PATENT OFFICE.

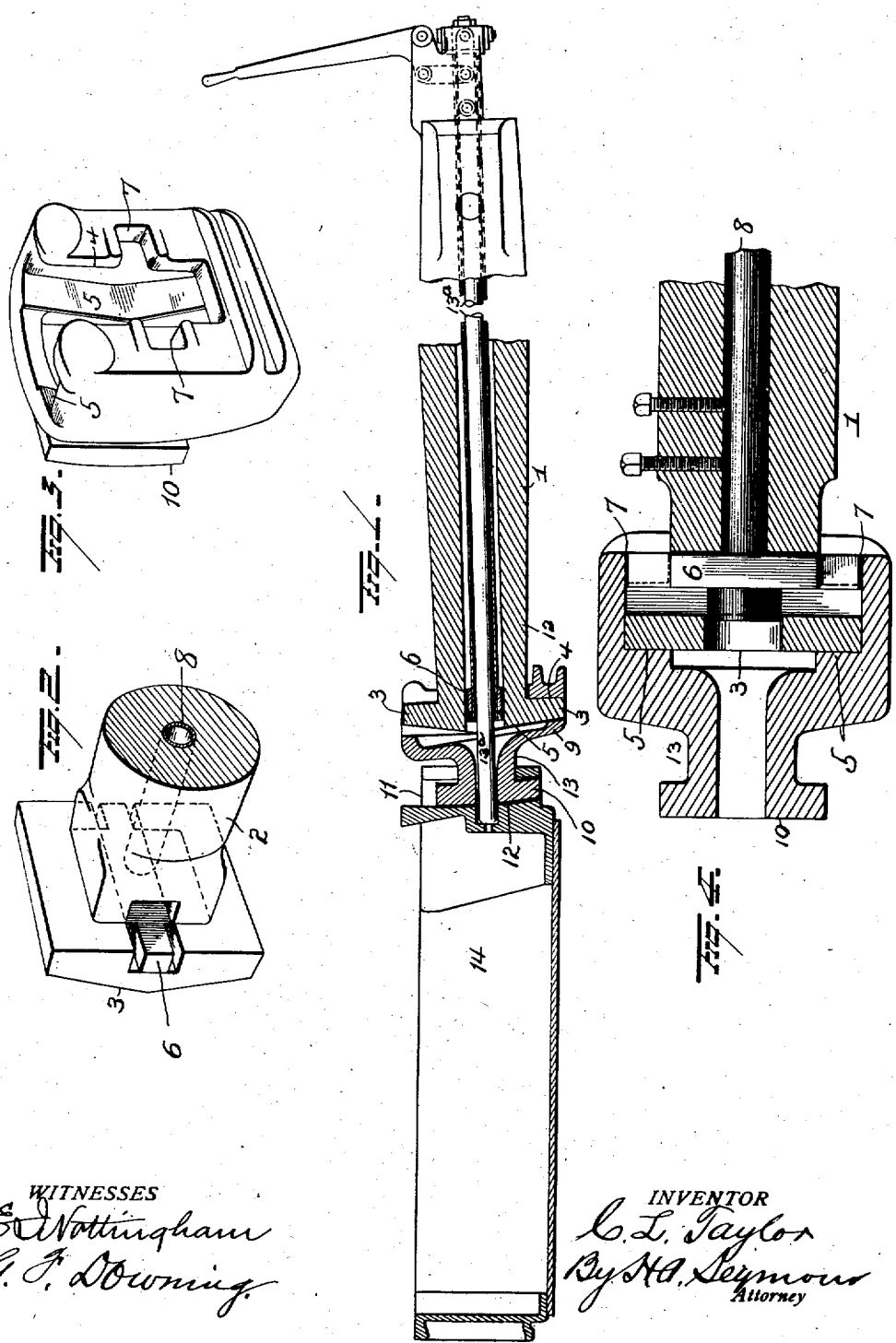

CLARENCE L. TAYLOR, OF ALLIANCE, OHIO, ASSIGNOR TO THE MORGAN ENGINEERING COMPANY, OF ALLIANCE, OHIO.

CHARGING-BAR FOR OPEN-HEARTH CHARGING-MACHINES.

No. 853,483.      Specification of Letters Patent.      Patented May 14, 1907.

Application filed August 20, 1906. Serial No. 331,379.

*To all whom it may concern:*

Be it known that I, CLARENCE L. TAYLOR, of Alliance, in the county of Stark and State of Ohio, have invented certain new and useful Improvements in Charging-Bars for Open-Hearth Charging-Machines; and I do hereby declare the following to be a full, clear, and exact description of the invention, such as will enable others skilled in the art to which it appertains to make and use the same.

My invention relates to improvements in charging bars for open hearth charging machines, the object being to provide means whereby a charging bar constructed to handle one type of charging box, can be readily and quickly converted into a bar adapted to handle boxes of other types, and the invention consists in a charging bar and detachable couplings each coupling adapted to be locked to said bar and constructed to engage a particular type of box.

In the accompanying drawings, Figure 1 is a view in section of a charging bar, a detachable coupling thereon, and a charging box secured to the coupling. Fig. 2 is a view in perspective of the end of the charging bar showing the fixed head thereon, Fig. 3 is a view of a detachable coupling, and Fig. 4 is a view in horizontal section through the head of the charging bar and coupling.

In the drawings, I have shown the charging bar having fixed head adapted for use with the box shown in U. S. Patent No. 792,681 granted June 20th, 1905, but it is evident that the bar may be constructed with a head designed for use with another type of box.

1 represents the charging bar which in use is constructed to rotate and rock, and is preferably made in two parts, the rear part of which is mounted in a carrier (not shown) and projects from the latter at its front end, while the other part which is exposed and subjected to wear, hard usage and the intense heat of the furnace, is preferably movably secured to the projecting end of the rear section, so as to permit it to be removed for repairs or renewal without disturbing the rear section.

The outer section 2 of the charging bar is provided with a double wedge shaped head 3 which latter is designed for use as above explained with the charging box covered by Patent 792,681. This box has a pocket having a straight wall 4 and an inclined wall 5 as shown on the coupling. Mounted in this head midway between its ends, is a sliding lock 6 which latter is adapted when moved rearward or away from the charging box, to enter recesses 7 in the pocket of the box or coupling and thus lock the head of the bar or coupling to the box. This lock 6 is connected to a tube 8, which latter passes lengthwise through the charging bar, and is provided at its rear end, adjacent to the rear or inner end of the charging bar, with a lever by which the tube carrying the lock is moved longitudinally.

A charging bar thus constructed can handle only boxes having a pocket shaped to receive the double wedge shaped head. To adapt this charging bar for other types of boxes, I employ a coupling 9 consisting of a body having a pocket in all respects like the pocket in the head of the box designed for use with the bar, and in the present instance the coupling is provided with the straight rear wall 4 and the inclined wall 5 before referred to, the rear wall 4 being open centrally at the top for the reception of the section of the charging bar immediately in rear of the double inclined head, and is also provided with the recesses 7 which open into the pocket for the reception of the sliding lock 6.

Projecting from the front wall of the coupling, is a head 10 designed for use with a box 14 of a different type. In this instance the head 10 is slightly curved vertically and provided with parallel front and rear faces, and is designed to fit within a pocket 11 having a front wall 12 conforming in curvature thereto, the rear wall being open from its top to a point below its center for the reception of the neck 13 of the head 10.

The neck 13 and head 10 of coupling 9, is provided centrally with an opening for the passage of the locking bar 13$^a$, which latter enters a recess in the front wall of the pocket and locks the box 14 in place. This locking bar passes rearwardly through the charging bar and through the operating tube 8, and is actuated by a lever located adjacent to the rear or inner end of the charging bar.

It is apparent that couplings designed for types of boxes other than those shown, can be employed in connection with the charging bar, and that instead of using a charging bar with a double wedge shaped head, it may have a head like that shown at 10, in which event the couplings would all have to be equipped with pockets to receive the head, and with heads conforming to the pockets on the boxes with which they are to be used. It will therefore be readily seen, that in order to convert a charging bar for handling our type of box, into a bar for handling another type of box, it is simply necessary to lock the proper coupling to the end of the bar.

When the charging bar is being used without a coupling and with its own type of box, the locking rod 13ª is removed or withdrawn sufficiently so as not to interfere in the operation of the apparatus.

It is evident that many slight changes might be resorted to in the relative arrangement of parts shown and described without departing from the spirit and scope of my invention hence I would have it understood that I do not wish to confine myself to the exact construction of parts shown and described, but, Having fully described my invention what I claim as new and desire to secure by Letters-Patent, is:—

1. The combination with a charging bar having a head adapted to enter a pocket in a charging box of one type, of a detachable coupling having a pocket to receive the head on the bar and provided with a head to engage the pocket in a charging box of a different type, and means for locking said coupling to the head.

2. The combination with a charging bar having a head adapted to conform to the pocket in one type of charging box, of a detachable coupling having a pocket to receive the head on the bar and provided with a head to engage the pocket in a charging box of a different type, means for locking the coupling to the charging bar and means for locking the box to the coupling.

In testimony whereof, I have signed this specification in the presence of two subscribing witnesses.

CLARENCE L. TAYLOR.

Witnesses:
A. L. ROBERTS,
N. C. FETTERS.